United States Patent
Zeng et al.

(10) Patent No.: US 12,101,390 B2
(45) Date of Patent: Sep. 24, 2024

(54) SIGNAL COMMUNICATION APPARATUS AND METHOD HAVING RE-SAMPLING MECHANISM

(71) Applicant: REALTEK SEMICONDUCTOR CORPORATION, Hsinchu (TW)

(72) Inventors: Chih-Hsiu Zeng, Hsinchu (TW); Chang-Ming Lee, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 141 days.

(21) Appl. No.: 18/096,186

(22) Filed: Jan. 12, 2023

(65) Prior Publication Data
US 2023/0254107 A1    Aug. 10, 2023

(30) Foreign Application Priority Data
Feb. 8, 2022    (TW) .................................. 111104476

(51) Int. Cl.
H04L 7/00 (2006.01)
H04B 1/10 (2006.01)

(52) U.S. Cl.
CPC ......... *H04L 7/0054* (2013.01); *H04B 1/1027* (2013.01)

(58) Field of Classification Search
CPC . H04L 7/0054; H04L 7/0029; H04L 27/2657; H04B 1/1027; G06F 1/08; H03M 1/1255
USPC ........................................ 375/355, 354, 357
See application file for complete search history.

(56) References Cited

U.S. PATENT DOCUMENTS

| | | | |
|---|---|---|---|
| 7,200,196 B2* | 4/2007 | Li | H04L 27/2657 375/220 |
| 9,100,036 B2* | 8/2015 | Tsukamoto | H03M 1/1255 |
| 10,763,866 B2* | 9/2020 | Ryu | G06F 1/08 |
| 2004/0047463 A1* | 3/2004 | Hwang | H04L 7/0029 379/387.01 |
| 2007/0182604 A1* | 8/2007 | Aerts | H04L 27/2657 341/118 |
| 2010/0189207 A1* | 7/2010 | Jibry | H04L 7/0029 375/371 |

OTHER PUBLICATIONS

Farrow, "A continuously variable digital delay element", 1988, IEEE paper, New Jersey.
Fu et al., "Trigonometric polynomial interpolation for timing recovery", Feb. 2005, IEEE paper.

* cited by examiner

*Primary Examiner* — Phuong Phu
(74) *Attorney, Agent, or Firm* — WPAT, P.C

(57) ABSTRACT

The present invention discloses a signal communication method having re-sampling mechanism that includes steps outlined below. Sampled data of a data signal is obtained. A time difference between an actual sampling time point and an ideal sampling time point is calculated. A closet time point closest to the ideal sampling time point within a sampling time interval is selected. Operation sampled data within a predetermined range around the target sampled data is selected from the sampled data. A group of response terms are retrieved from a pre-stored lookup table according to the closest time point to substitute the response terms and the time difference into a parameter calculation equation to generate a group of re-sampling response parameters. A calculation is performed based on the operation sampled data and the re-sampling response parameters to generate a re-sampled value of the target sampled data.

10 Claims, 4 Drawing Sheets

SIGNAL COMMUNICATION APPARATUS AND METHOD HAVING RE-SAMPLING MECHANISM

BACKGROUND OF THE INVENTION

1. Field of the Invention

The present invention relates to a signal transmission/receiving apparatus and a signal transmission/receiving method having re-sampling mechanism.

2. Description of Related Art

In wireless communication technology, whether data delivered by a delivering terminal can be accurately received by a receiving terminal depends on the sampling rate of the receiving terminal. However, since the oscillators in the receiving terminal and the delivering terminal are not ideally the same, the sampling rate of the receiving terminal is actually deviated from that of the delivering terminal.

In a communication system that uses such as, but not limited to orthogonal frequency division multiplexing (OFDM) technology, the deviation of the sampling frequency results in the inter-carrier interference (ICI), which becomes even more severe in high data rate transmission. How to use re-sampling technology to obtain the correctly sampled data signal becomes an important issue.

SUMMARY OF THE INVENTION

In consideration of the problem of the prior art, an object of the present invention is to supply a mesh network system and a mesh network system communication method of the same having data flow transmission sorting mechanism.

The present invention discloses a signal communication method having re-sampling mechanism used in a signal communication apparatus that includes steps outlined below. Sampled data of a data signal is obtained. A time difference between an actual sampling time point and an ideal sampling time point that a target sampled data of the data signal corresponds to is calculated according to the carrier frequency offset between a signal delivering terminal and a signal receiving terminal. From a set of predetermined time points, a closest time point that is closest to the ideal sampling time point is selected, wherein the predetermined time points are within a sampling interval determined by a sampling frequency. A plurality of operation sampled data is selected from the sampled data in a predetermined range around the target sampled data. A set of response terms are retrieved from a pre-stored lookup table according to the closest time point to substitute the set of response terms and the time difference into a parameter equation perform calculation thereon to generate a set of re-sampling response parameters. Corresponding calculation is performed on the operation sampled data and the set of re-sampling response parameters to perform re-sampling to generate a re-sampling value of the target sampled data.

The present invention also discloses a signal communication apparatus having re-sampling mechanism that includes a storage circuit and a processing circuit. The storage circuit is configured to store a computer executable command. The processing circuit is configured to retrieve the computer executable command from the storage circuit and is further configured to perform the steps outlined below. Sampled data of a data signal is obtained. A time difference between an actual sampling time point and an ideal sampling time point that a target sampled data of the data signal corresponds to is calculated according to the carrier frequency offset between a signal delivering terminal and a signal receiving terminal. From a set of predetermined time points, a closest time point that is closest to the ideal sampling time point is selected, wherein the predetermined time points are within a sampling interval defined by a sampling frequency. A plurality of operation sampled data is selected from the sampled data in a predetermined range around the target sampled data. A set of response terms are retrieved from a pre-stored lookup table according to the closest time point to substitute the set of response terms and the time difference into a parameter equation perform calculation thereon to generate a set of re-sampling response parameters. Corresponding calculation is performed on the operation sampled data and the set of re-sampling response parameters to perform re-sampling to generate a re-sampling value of the target sampled data.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a signal communication apparatus and a signal communication method having re-sampling mechanism to retrieve corresponding response terms from a pre-stored lookup table according to a time difference between an actual sampling time point and an ideal sampling time point, so as to perform calculation accordingly to generate re-sampling response parameters to perform re-sampling by perform corresponding calculation on operation sampled data within a neighboring range around a target sampled data and the set of re-sampling response parameters. Operation amount and complexity can be greatly reduced.

Figure 1:
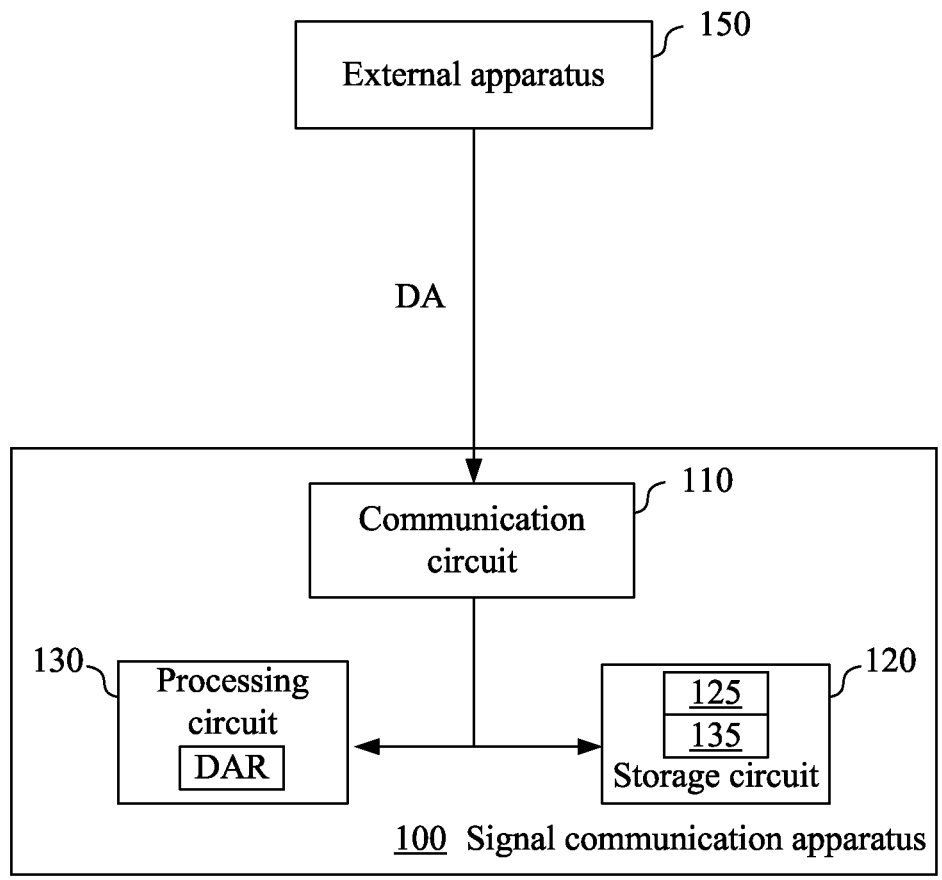
FIG. 1 illustrates a block diagram of a signal communication apparatus having re-sampling mechanism and an external apparatus according to an embodiment of the present invention.

Reference is now made to FIG. 1. FIG. 1 illustrates a block diagram of a signal communication apparatus 100 having re-sampling mechanism and an external apparatus 150 according to an embodiment of the present invention.

The signal communication apparatus 100 is configured to perform communication with the external apparatus 150 to transmit a data signal DA. The signal communication apparatus 100 includes a communication circuit 110, a storage circuit 120 and a processing circuit 130.

The communication circuit 110 can be any circuit that is equipped with wireless or wired communication technology and is capable of performing communication with the external apparatus 150. In an embodiment, the external apparatus 150 operates as a signal delivering terminal and the signal communication apparatus 100 operates as a signal receiving terminal. As a result, the data signal DA is received by the processing circuit 130 from the external apparatus 150 through the communication circuit 110.

The storage circuit 120 can be any storage device that is capable of storing data, such as but not limited to a random access memory (RAM), a read only memory (ROM) or a hard drive. It is appreciated that in different embodiments, the storage circuit 120 may include only one of the storage devices described above or more that one of the storage devices described above to store different types of data. In an embodiment, the storage circuit 120 is configured to store a computer executable command 125.

The processing circuit 130 is electrically coupled to the communication circuit 110 and the storage circuit 120. In an embodiment, the processing circuit 130 is configured to retrieve and execute the computer executable command 125 from the storage circuit 120. The computer executable command 125 includes such as, but not limited to software, firmware, driver and related commands of the hardware modules including the communication circuit 110 and the storage circuit 120 so as to access the signal and data of the communication circuit 110 and the storage circuit 120 to perform operation to execute the function of the signal communication apparatus 100.

Figure 2:
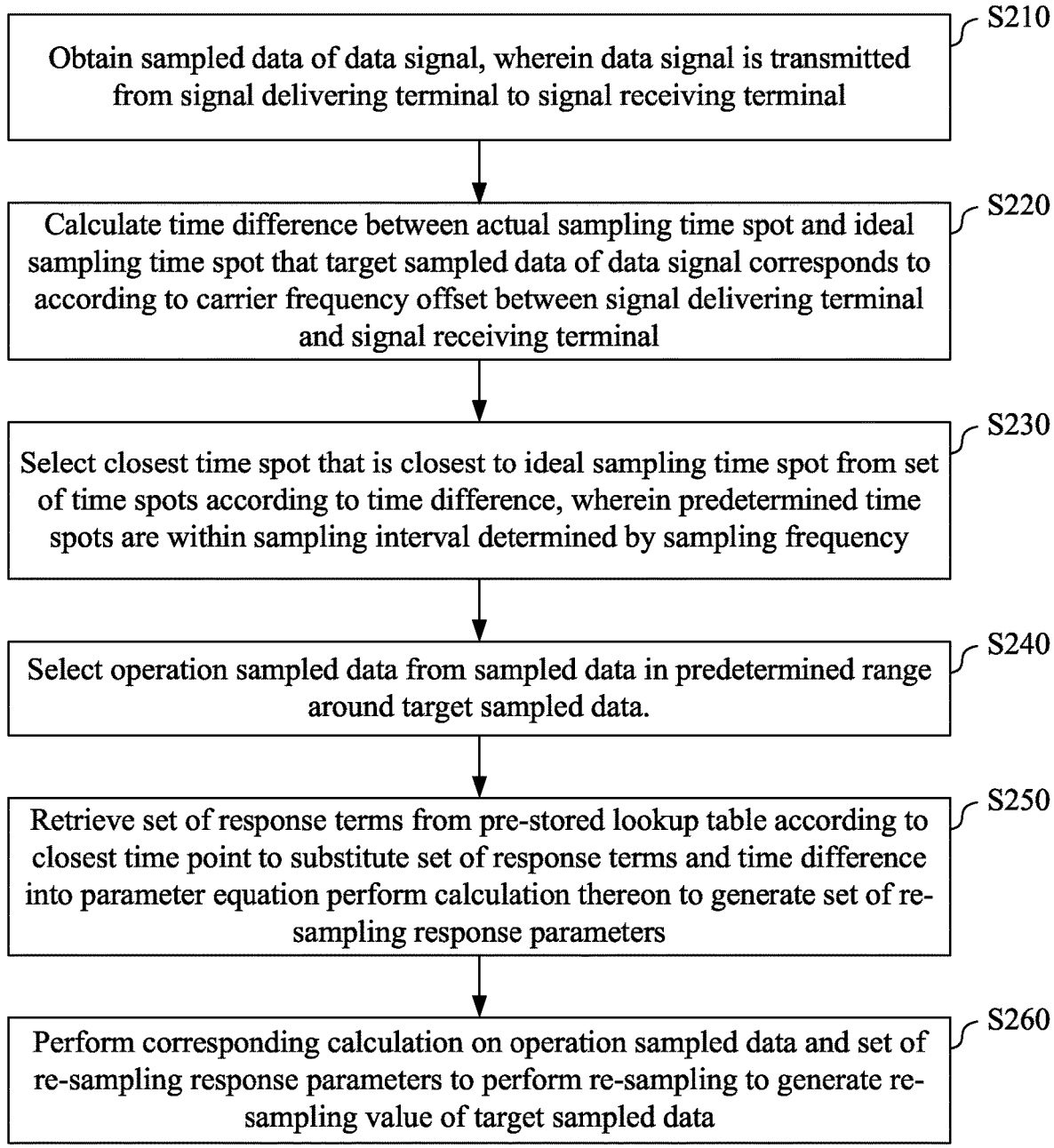
FIG. 2 illustrates a flow chart of a signal communication method having re-sampling mechanism according to an embodiment of the present invention.

The operation of the signal communication apparatus 100 is described in detail in accompany with FIG. 2.

FIG. 2 illustrates a flow chart of a signal communication method 200 having re-sampling mechanism according to an embodiment of the present invention. The signal communication method 200 is used in such as, but not limited to the signal communication apparatus 100 in FIG. 1. As illustrated in FIG. 2, an embodiment of the signal communication method 200 includes the following steps.

In step S210, sampled data of the data signal DA is obtained, wherein the data signal DA is transmitted from a signal delivering terminal to a signal receiving terminal. In the present embodiment, the data signal DA is received by the processing circuit 130 from the external apparatus 150 through the communication circuit 110.

In step S220, a time difference between an actual sampling time point and an ideal sampling time point that a target sampled data of the data signal corresponds to is calculated according to the carrier frequency offset between the signal delivering terminal and the signal receiving terminal.

Figure 3:
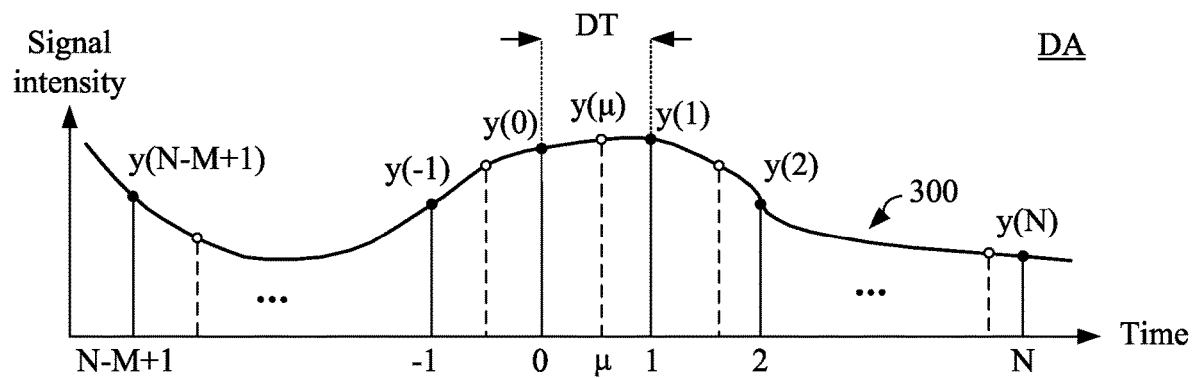
FIG. 3 illustrates a diagram of the data signal according to an embodiment of the present invention.

Reference is now made to FIG. 3. FIG. 3 illustrates a diagram of the data signal DA according to an embodiment of the present invention. In FIG. 3, a Y-axis stands for the signal intensity and an X-axis stands for the time.

FIG. 3 illustrates an analog waveform 300 of the data signal DA in the analog form. The sampling frequencies of the signal delivering terminal and the signal receiving terminal are not ideally the same, and a plurality of samples are generated when the signal receiving terminal performs sampling on the analog waveform 300, in which the actual sampling points are illustrated as black dots. In FIG. 3, the actual sampling points corresponding to time points N−M+1~N are illustrated.

The time length between each two neighboring actual sampling points, e.g., the time length DT between the time points 0~1, is a sampling interval determined by the sampling frequency of the signal receiving terminal. The actual value of the sampling interval is the inverse of the sampling frequency and is normalized as 1 herein. The sampled signals corresponding to the time points N−M+1~N have values y(N−M+1)~y(N).

On the other hand, under an ideal condition that the sampling frequencies of the signal delivering terminal and the signal receiving terminal are the same, a plurality of ideal samples are generated when the signal receiving terminal performs sampling on the analog waveform 300, in which the ideal samples are illustrated as white dots. In FIG. 3, one of the ideal samples corresponding to the time point $\mu$ is exemplarily labeled. Such an ideal sampling time is between the time points 0~1 and yields a sampled data y($\mu$), in which $\mu$ is a fractional number between 0~1.

In the present embodiment, the condition that the sampled data y(0) is the actual sampled data is used as an example. The sampled data y(0) corresponds to the actual sampling time instant 0, and the ideal sampled data y($\mu$) related thereto corresponds to an ideal sampling time instant $\mu$.

For the signal receiving terminal, the carrier frequency offset between the signal delivering terminal and the signal receiving terminal are known. As a result, the processing circuit 130 can calculate the value of a time difference $\mu$ between the actual sampling time 0 and the ideal sampling time $\mu$ according to the carrier frequency offset. Since the sampling interval between each neighboring two of the actual sampling points is normalized as 1, such a time difference $\mu$ is a fractional delay between the ideal sampled data y($\mu$) and the sampled data y(0).

In step S230, from a set of predetermined time points, the closest time point that is closest to the ideal sampling time is selected, wherein the predetermined time points are within the sampling interval determined by the sampling frequency of the signal receiving terminal.

Figure 4:
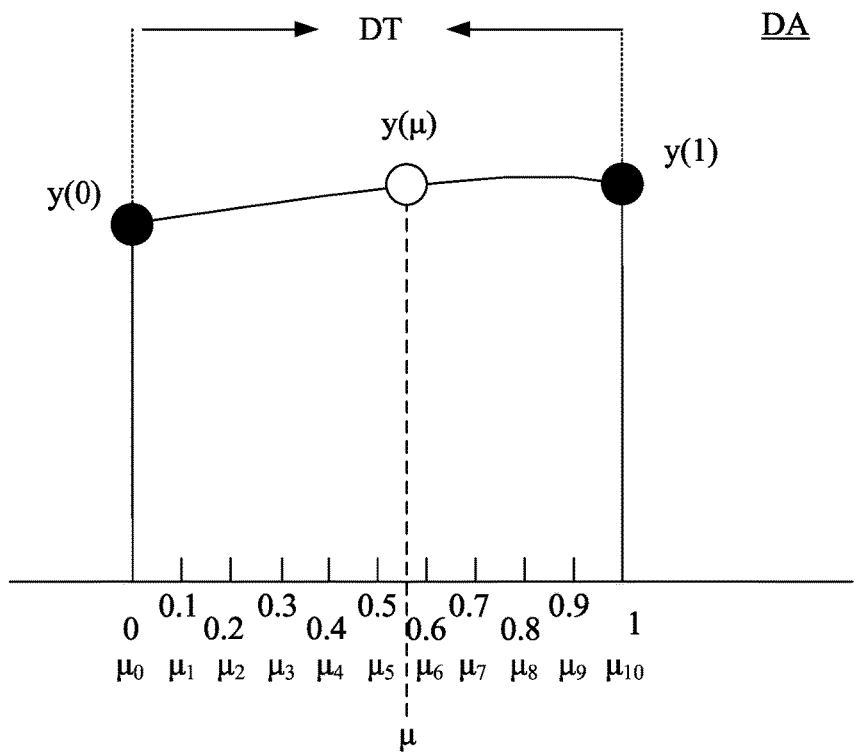
FIG. 4 illustrates a partially enlarged diagram of the data signal according to an embodiment of the present invention.

Reference is now made to FIG. 4. FIG. 4 illustrates a partially enlarged diagram of the data signal DA according to an embodiment of the present invention.

FIG. 4 mainly illustrates an enlarging part of the section between the time points 0 and 1, which respectively correspond to the sampled data y(0) and the sampled data y(1). In the sampling interval between 0 and 1, 11 predetermined time points $\mu_0$~$\mu_{10}$ corresponding to the values of 0, 0.1, 0.2 . . . 0.9 and 1 may be included. It is appreciated that the number of the predetermined time points and the interval between any two neighboring predetermined time points can be designed according to the required precision and are not limited by the numbers described in the present embodiment.

As a result, the processing circuit 130 will select the time point $\mu_{tab}$, closest to the ideal sampling time point $\mu$. For example, when $\mu$ is 0.56, the processing circuit 130 may select the time point $\mu_6$ with the value 0.6 as the closest time point $\mu_{tab}$.

In step S240, a plurality of operation sampled data is selected from the sampled data in a predetermined range around the target sampled data y($\mu$).

In the present embodiment, since the target sampled data is y($\mu$), the processing circuit 130 sets a range from time points N−M+1~N as the predetermined range and selects the sampled data y(N−M+1)~y(N) as the operation sampled data, wherein M and N are positive integers. M is a total number of the sampled data to be selected within the predetermined range around the target sampled data and N is a number of the sampled data to be selected that are behind the time point of the target sampled data. For example, when M is 6 and N is 2, the processing circuit 130 sets a range from the time points −3~2 as the predetermined range and selects the sampled data y(−3)~y(2) as the operation sampled data.

In step S250, a set of response terms are retrieved from a pre-stored lookup table according to the closest time point to substitute the set of response terms and the time difference into a parameter equation perform calculation thereon to generate a set of re-sampling response parameters.

In an embodiment, a pre-stored lookup table 135 is stored in the storage circuit 120 in FIG. 1 or other storage devices included in the signal communication apparatus 100. The processing circuit 130 may, according to such as but not limited to the closest time point $\mu_{tab}$ which is the predetermined time points $\mu_6$, retrieve a set of response terms $cv_i(\mu_{tab})$ from the pre-stored lookup table 135. In an embodiment, the response terms $cv_i(\mu_{tab})$ are a vector that is expressed by the following equation:

$$cv_i(\mu_{tab}) = A_M^{-1} \sum_{n=i}^{K} \frac{sv_M^{(n)}(\mu_{tab})}{n!} \binom{n}{i}(-\mu_{tab})^{n-i} \quad \text{(equation 1)}$$

The detail of the parameters in the response terms $cv_i(\mu_{tab})$ are described later in the paragraphs about the construction of the pre-stored lookup table 135. After the response terms $cv_i(\mu_{tab})$ is retrieved, the processing circuit 130 substitutes the time difference $\mu$ into the parameter equation to perform calculation and generates the re-sampling response parameters $hvr_\mu$. The re-sampling response parameters $hvr_\mu$ are also a vector that is expressed by the following equation:

$$hvr_\mu = \sum_{i=0}^{K} cv_i(\mu_{tab})\mu^i \quad \text{(equation 2)}$$

In step S260, the corresponding calculation is performed on the operation sampled data and the set of re-sampling response parameters to perform re-sampling to generate a re-sampling value of the target sampled data. As a result, the re-sampled data signal DAR generated by the processing circuit 130 has the re-sampling value.

In an embodiment, the processing circuit 130 performs corresponding calculation on the operation sampled data y(N−M+1)~y(N) and the set of re-sampling response parameters $hvr_\mu$ to generate the re-sampling value $yr(\mu)$ of the target sampled data. The re-sampling value $yr(\mu)$ approximates the value of the ideal sampled data $y(\mu)$ and is expressed by the following equation:

$$yr(\mu) = \sum_{n=N-M+1}^{N} y(n)hr_\mu(-n) \quad \text{(equation 3)}$$

The parameter $hr_\mu(-n)$ is the individual parameter included in the set of the re-sampling response parameters $hvr_\mu$.

In an embodiment, when the sampled data y(N−M+1)~y(N) that serves as the operation sampled data and a set of actual response parameters $hv_\mu$ are correspondingly calculated, the calculation result generated accordingly has a minimum difference from an ideal sampling value (the value of the ideal sampled data $y(\mu)$). However, the time difference $\mu$ is a fractional number and the possibility of actual value varies according to the precision thereof. For example, when the precision is set such that the value of the time difference $\mu$ includes two decimal places, the time difference $\mu$ may include 101 possible values. When more possible values of the actual response parameters $hv_\mu$ are presented, the operation complexity increases. As a result, the set of actual response parameters $hv_\mu$ can be approximated by a predetermined polynomial to generate the set of response terms $cv_i(\mu_{tab})$ to avoid the high operation complexity when too many possible values of the time difference $\mu$ are presented.

The construction of the pre-stored lookup table 135 that includes the response terms $cv_i(\mu_{tab})$ is described in the following paragraphs.

As described above, the value of the ideal sampled data $y(\mu)$ can be generated by using the sampled data y(N−M+1)~y(N) and the set of actual response parameters $hv_\mu$, and can be expressed by the following equation:

$$y(\mu) = \sum_{n=N-M+1}^{N} y(n)h_\mu(-n) \quad \text{(equation 4)}$$

The parameter $h_\mu(-n)$ represents each of the parameters included in the set of actual response parameters $hv_\mu$. The frequency response of the set of actual response parameters $hv_\mu$ is expressed in the following equation:

$$H_\mu(e^{j\omega}) = \sum_{n=-N}^{M-N-1} h_\mu(n)e^{-j\omega n} = \quad \text{(equation 5)}$$
$$h_\mu(-N)e^{j\omega N} + \ldots + h_\mu(M-N-1)e^{j\omega(-M+N+1)}$$

In order to make such a frequency response approximate the ideal frequency response $e^{j\omega\mu}$, the error function shown below needs to be minimized.

$$E(\mu) = \int_{-B\pi}^{B\pi} |H_\mu(e^{j\omega}) - e^{j\omega\mu}|^2 d\omega \quad \text{(equation 6)}$$

The value of the predetermined parameter B is between 0~1. The actual response parameters $hv_\mu$ can minimize the error function $E(\mu)$ by using the following equation:

$$hv_\mu = A_M^{-1} sv_M(\mu) \quad \text{(equation 7)}$$

$A_M$ is a matrix having the dimension of M×M, and the element of (l,k) is:

$$(A_M)_{l,k} = \frac{\sin((l-k)B\pi)}{l-k} \text{ for } l \neq k \quad \text{(equation 8)}$$

$$(A_M)_{l,k} = B\pi \text{ for } l = k \quad \text{(equation 9)}$$

$sv_M(\mu)$ is a vector having a length of M and is expressed by the following equations:

$$sv_M(\mu) = [S_{-N}(\mu)S_{-N+1}(\mu) \ldots S_{M-N-1}(\mu)]^T \quad \text{(equation 10)}$$

$$S_m(\mu) = \frac{\sin(B\pi(m+\mu))}{m+\mu},$$

m ranging from −N~M−N−1 (equation 11)

In the parameter described above, $A_M$ is not related to the fractional delay. As a result, the elements in the inverted matrix $A_M^{-1}$ can be calculated in advance instead of in real-time. Besides, the predetermined parameter B is known. As a result, the only variant in the actual response parameters $hv_\mu$ is the time difference $\mu$. The calculation of the time difference $\mu$ in equation 11 requires division operation, which is difficult to be implemented.

In order the simplify the calculation, a plurality of predetermined time points are set in the normalized sampling interval to perform calculation based on these predetermined time points in advance and construct the pre-stored lookup table 135 according to the calculation result. The processing circuit 130 may determine the predetermined time point closest to the ideal sampling time point based on the time difference $\mu$ to look up the table accordingly to save the cost of time and calculation of real-time calculation.

More specifically, in an embodiment, the predetermined time points are a set of values including such as, but not limited to 0, 0.1, 0.2, . . . 0.9 and 1.0. One of the predetermined time points is closest to the time difference $\mu$ and becomes the closest time point $\mu t$. The actual response parameters $hv_\mu$ in equation 7 can be approximated by the re-sampling response parameters $hv_\mu$ expressed by a polynomial of degree K in equation 2. The approximation of the actual response parameters $hv_\mu$ is expressed by the following equation:

$$hv_\mu = A_M^{-1} sv_M(\mu) \approx hvr_\mu = \sum_{i=0}^{K} cv_i(\mu_{tab})\mu^i \quad \text{(equation 12)}$$

In an embodiment, the vector $sv_M(\mu)$ in equation 2 is approximated by using such as, but not limited to Taylor's Expansion and is expressed by the following two equations:

$$sv_M(\mu) \approx \sum_{n=0}^{K} \frac{sv_M^{(n)}(\mu_{tab})}{n!}(\mu - \mu_{tab})^n = \quad \text{(equation 13)}$$

$$\sum_{i=0}^{K} \left( \sum_{n=i}^{K} \frac{sv_M^{(n)}(\mu_{tab})}{n!} \binom{n}{i}(-\mu_{tab})^{n-i} \right) \mu^i$$

$$sv_M^{(n)}(\mu_{tab}) = \left[ s_{-N}^{(n)}(\mu_{tab}) s_{-N+1}^{(n)}(\mu_{tab}) \ldots s_{M-N-1}^{(n)}(\mu_{tab}) \right]^T \quad \text{(equation 14)}$$

In equation 14, the term $s_m^{(n)}(\mu_{tab})$ (m ranging from $-N \sim M-N-1$) is the n-th order differential derivative of $s_m(\mu)$ at the closest time point $\mu_{tab}$. As a result, accordingly to the derivation process from equation 7 to equation 14, the set of response terms $cv_i(\mu_{tab})$ are expressed by equation 1 and are stored in the pre-stored lookup table 135 after being calculated in advance.

As a result, the processing circuit 130, according to step S250 and S260 in FIG. 2, may retrieve the set of response terms $cv_i(\mu_{tab})$ according to the closest time point $\mu_{tab}$, generate the re-sampling response parameters $hvr_\mu$ according to the calculation of equation 2 and perform corresponding calculation on the operation sampled data $y(N-M+1) \sim y(N)$ and the set of re-sampling response parameters $hvr_\mu$ to perform re-sampling to generate the re-sampling value $yr(\mu)$ of the target sampled data.

It is appreciated that the construction of the pre-stored lookup table 135 described above is merely an example. In other embodiments, the pre-stored lookup table 135 can be constructed by using other error functions, other polynomials used to perform approximation and other numbers of predetermined time points disposed in the sampling interval. The present invention is not limited by the embodiments described above.

Figure 5:
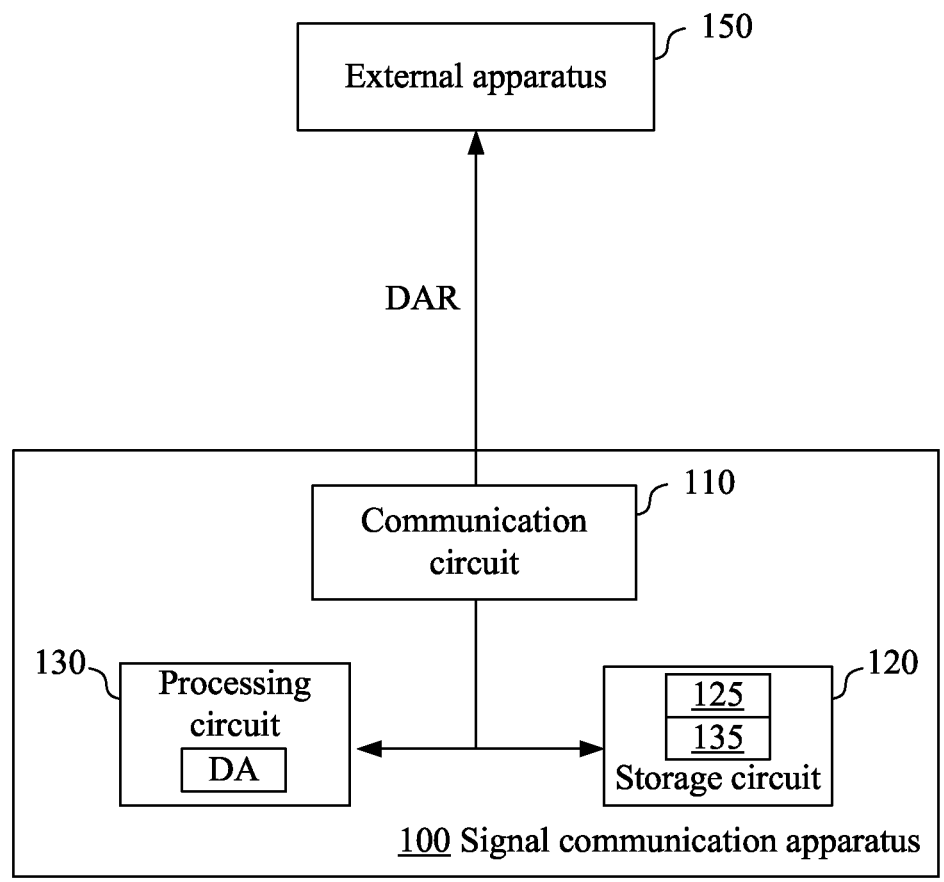
FIG. 5 illustrates a block diagram of the signal communication apparatus having re-sampling mechanism and the external apparatus according to another embodiment of the present invention.

Reference is now made to FIG. 5. FIG. 5 illustrates a block diagram of the signal communication apparatus 100 having re-sampling mechanism and the external apparatus 150 according to another embodiment of the present invention.

Similar to the signal communication apparatus 100 in FIG. 1, the signal communication apparatus 100 in FIG. 5 is configured to perform communication with the external apparatus 150 to transmit the data signal DA and includes the communication circuit 110, the storage circuit 120 and the processing circuit 130. However, in the present embodiment, the external apparatus 150 operates as the signal receiving terminal and the signal communication apparatus 100 operates as the signal delivering terminal.

In the present embodiment, the signal communication apparatus 100 that operates as the signal delivering terminal can also execute the signal communication method 200 having re-sampling mechanism in FIG. 2 such that the processing circuit 130 performs re-sampling on the data signal DA to generate the re-sampling value of the target sampled data. The re-sampled data signal DAR is delivered to the external apparatus 150 through the communication circuit 110. Under such a condition, since the signal communication apparatus 100 already performs re-sampling, the external apparatus 150 can directly receive the re-sampled data signal DAR without the need to perform re-sampling.

It is appreciated that the embodiments described above are merely an example. In other embodiments, it should be appreciated that many modifications and changes may be made by those of ordinary skill in the art without departing from the spirit of the disclosure.

In summary, the present invention discloses the signal communication apparatus and the signal communication method having re-sampling mechanism to retrieve corresponding response terms from a pre-stored lookup table according to a time difference between an actual sampling time point and an ideal sampling time point, so as to perform calculation accordingly to generate re-sampling response parameters to perform re-sampling by the corresponding calculation on operation sampled data within a neighboring range around the target sampled data and the set of re-sampling response parameters. Operation amount and complexity can be greatly reduced.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A signal communication method having re-sampling mechanism used in a signal communication apparatus, comprising:
    obtaining sampled data of a data signal;
    calculating a time difference between an actual sampling time point and an ideal sampling time point that a target sampled data of the data signal corresponds to according to the carrier frequency offset between a signal delivering terminal and a signal receiving terminal;
    selecting a closest time point that is closest to the ideal sampling time point from a set of predetermined time points, wherein the predetermined time points are within a sampling interval determined by a sampling frequency;
selecting a plurality of operation sampled data from the sampled data in a predetermined range around the target sampled data;
retrieving a set of response terms from a pre-stored lookup table according to the closest time point to substitute the set of response terms and the time difference into a parameter equation perform calculation thereon to generate a set of re-sampling response parameters; and
performing corresponding calculation on the operation sampled data and the set of re-sampling response parameters to perform re-sampling to generate a re-sampling value of the target sampled data.

2. The signal communication method of claim 1, further comprising:
operating the signal communication apparatus as the signal receiving terminal to receive the data signal from an external apparatus through a communication circuit, and the data signal that is re-sampled comprises the re-sampling value.

3. The signal communication method of claim 1, further comprising:
operating the signal communication apparatus as the signal delivering terminal, wherein the data signal that is re-sampled comprises the re-sampling value and the data signal that is re-sampled is transmitted to an external apparatus through a communication circuit.

4. The signal communication method of claim 1, wherein a calculation result generated according to the corresponding calculation performed on the operation sampled data and a set of actual response parameters has a minimum difference from an ideal sampling value, and the set of response terms is generated according to the set of actual response parameters based on an approximation of a predetermined polynomial.

5. The signal communication method of claim 4, wherein the set of actual response parameters is $hv_\mu$ expressed by a product of an inverted matrix and a vector as $hv_\mu = A_M^{-1} sv_M(\mu)$ and approximated, when the closest time point is $\mu_{tab}$, by the set of response terms $cv_i(\mu_{tab})$ and the time difference $\mu$ as the set of re-sampling response parameters $$hvr_\mu = \sum_{i=0}^{K} cv_i(\mu_{tab})\mu^i,$$

wherein the set of response terms stored by the pre-stored lookup table are $$cv_i(\mu_{tab}) = A_M^{-1} \sum_{n=i}^{K} \frac{sv_M^{(n)}(\mu_{tab})}{n!} \binom{n}{i}(-\mu_{tab})^{n-i};$$

wherein $sv_M^{(n)}(\mu_{tab}) = [s_{-N}^{(n)}(\mu_{tab}) s_{-N+1}^{(n)}(\mu_{tab}) \ldots s_{M-N-1}^{(n)}(\mu_{tab})]^T$, the term $s_m^{(n)}(\mu_{tab})$ is the n-th order differential derivative of $s_m(\mu)$ at the closest time point $\mu_{tab}$;

$$s_m(\mu) = \frac{\sin(B\pi(m+\mu))}{m+\mu},$$

wherein m ranges from $-N \sim M-N-1$ and $\mu$ is the time difference, M is a total number of the sampled data to be selected within the predetermined range around the target sampled data and N is a number of the sampled data to be selected that are behind the time point of the target sampled data.

6. A signal communication apparatus having re-sampling mechanism, comprising:
a storage circuit configured to store a computer executable command; and
a processing circuit configured to retrieve the computer executable command from the storage circuit, the processing circuit is further configured to:
obtain sampled data of a data signal;
calculate a time difference between an actual sampling time point and an ideal sampling time point that a target sampled data of the data signal corresponds to according to the carrier frequency offset between a signal delivering terminal and a signal receiving terminal;
select a closest time point that is closest to the ideal sampling time point from a set of predetermined time points, which are within a sampling interval determined by a sampling frequency;
select a plurality of operation sampled data from the sampled data in a predetermined range around the target sampled data;
retrieve a set of response terms from a pre-stored lookup table according to the closest time point to substitute the set of response terms and the time difference into a parameter equation perform calculation thereon to generate a set of re-sampling response parameters; and
perform corresponding calculation on the operation sampled data and the set of re-sampling response parameters to perform re-sampling to generate a re-sampling value of the target sampled data.

7. The signal communication apparatus of claim 6, wherein the processing circuit is further configured to operate the signal communication apparatus as the signal receiving terminal to receive the data signal from an external apparatus through a communication circuit, and the data signal that is re-sampled comprises the re-sampling value.

8. The signal communication apparatus of claim 6, wherein the processing circuit is further configured to operate the signal communication apparatus as the signal delivering terminal, wherein the data signal that is re-sampled comprises the re-sampling value and the data signal that is re-sampled is transmitted to an external apparatus through a communication circuit.

9. The signal communication apparatus of claim 6, wherein a calculation result generated according to the corresponding calculation performed on the operation sampled data and a set of actual response parameters has a minimum difference from an ideal sampling value, and the set of response terms is generated according to the set of actual response parameters based on an approximation of a predetermined polynomial.

10. The signal communication apparatus of claim 9, wherein the set of actual response parameters is $hv_\mu$ expressed by a product of an inverted matrix and a vector as $hv_\mu = A_M^{-1} sv_M(\mu)$ and approximated, when the closest time point is $\mu_{tab}$, by the set of response terms $cv_i(\mu_{tab})$ and the time difference $\mu$ as the set of re-sampling response parameters $$hvr_\mu = \sum_{i=0}^{K} cv_i(\mu_{tab})\mu^i,$$

wherein the set of response terms stored by the pre-stored lookup table are $$cv_i(\mu_{tab}) = A_M^{-1} \sum_{n=i}^{K} \frac{sv_M^{(n)}(\mu_{tab})}{n!} \binom{n}{i} (-\mu_{tab})^{n-i};$$

wherein $sv_M^{(n)}(\mu_{tab}) = [s_{-N}^{(n)}(\mu_{tab}) s_{-N+1}^{(n)}(\mu_{tab}) \ldots s_{M-N-1}^{(n)}(\mu_{tab})]^T$, the term $s_m^{(n)}(\mu_{tab})$ is the n-th order differential derivative of $s_m(\mu)$ at the closest time point $\mu_{tab}$;

$$s_m(\mu) = \frac{\sin(B\pi(m+\mu))}{m+\mu},$$

wherein m ranges from $-N \sim M-N-1$ and $\mu$ is the time difference, M is a total number of the sampled data to be selected within the predetermined range around the target sampled data and N is a number of the sampled data to be selected that are behind the time point of the target sampled data.

\* \* \* \* \*